UNITED STATES PATENT OFFICE.

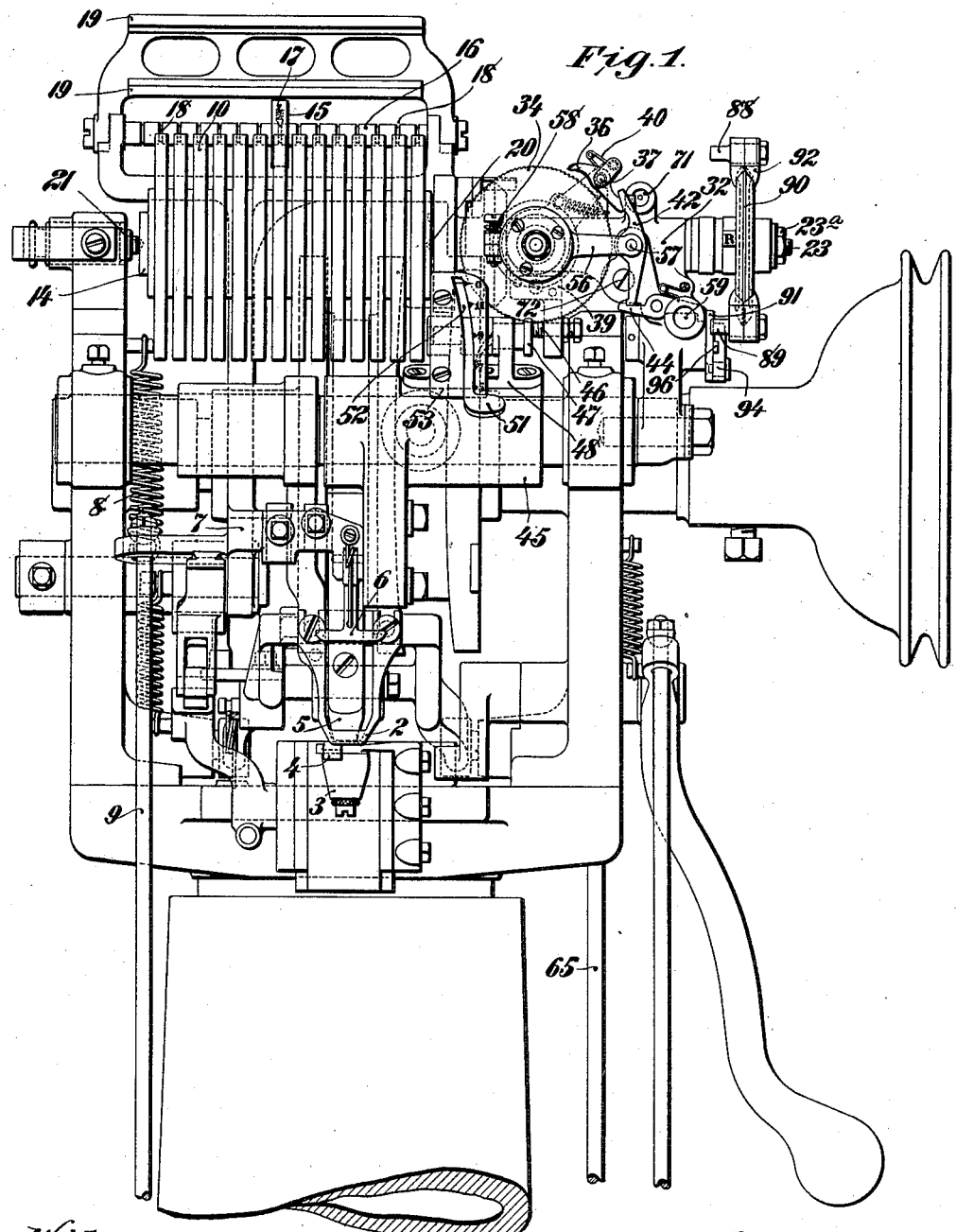

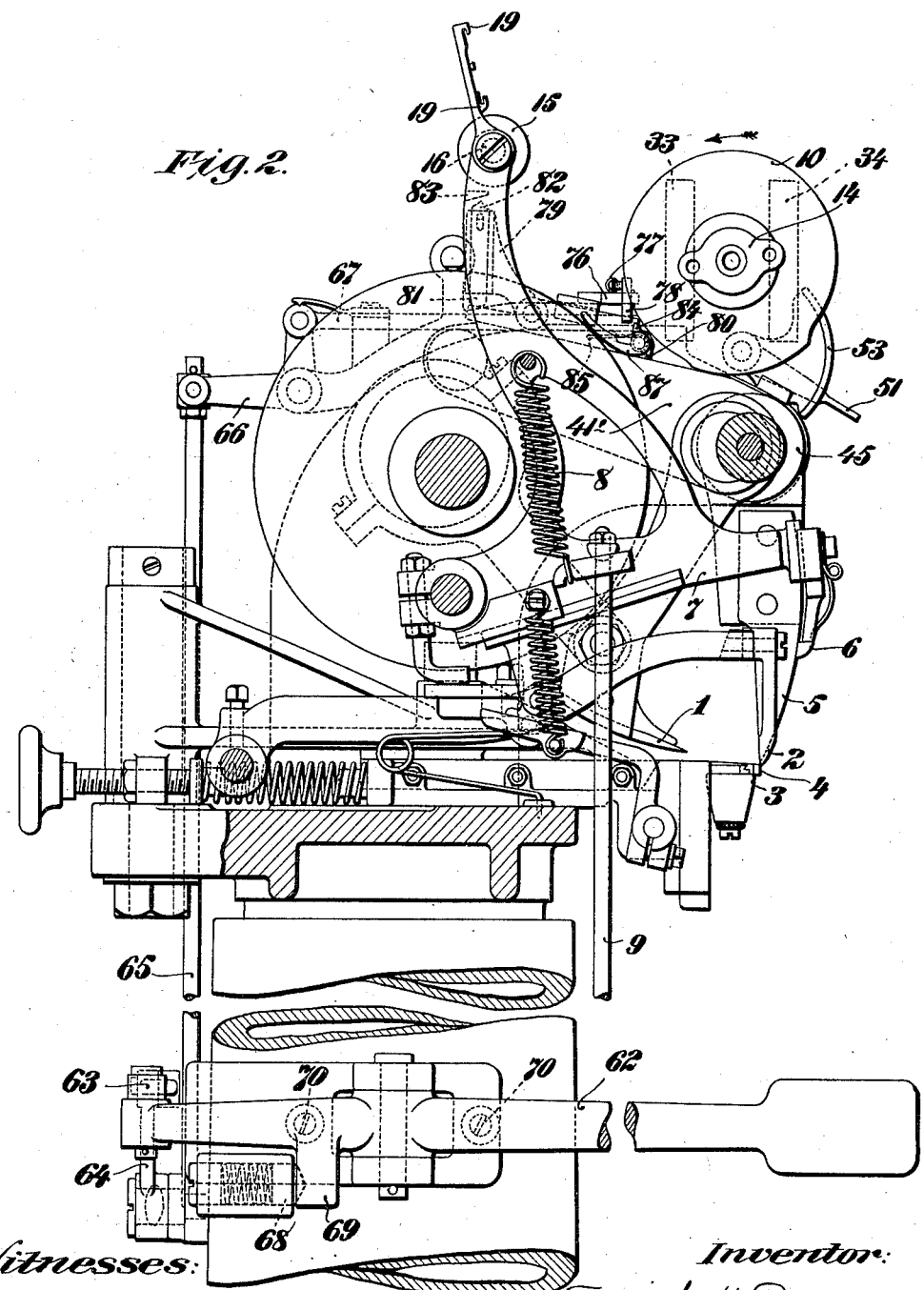

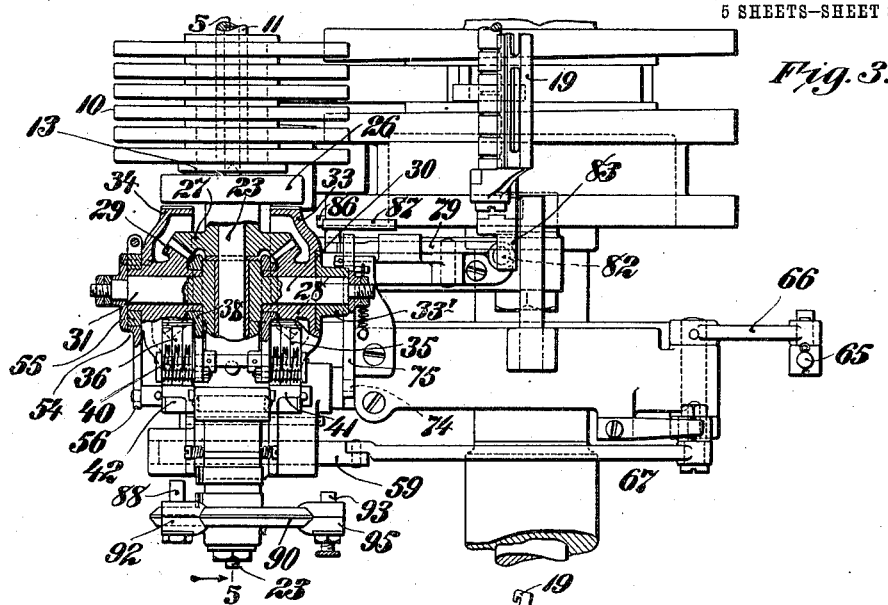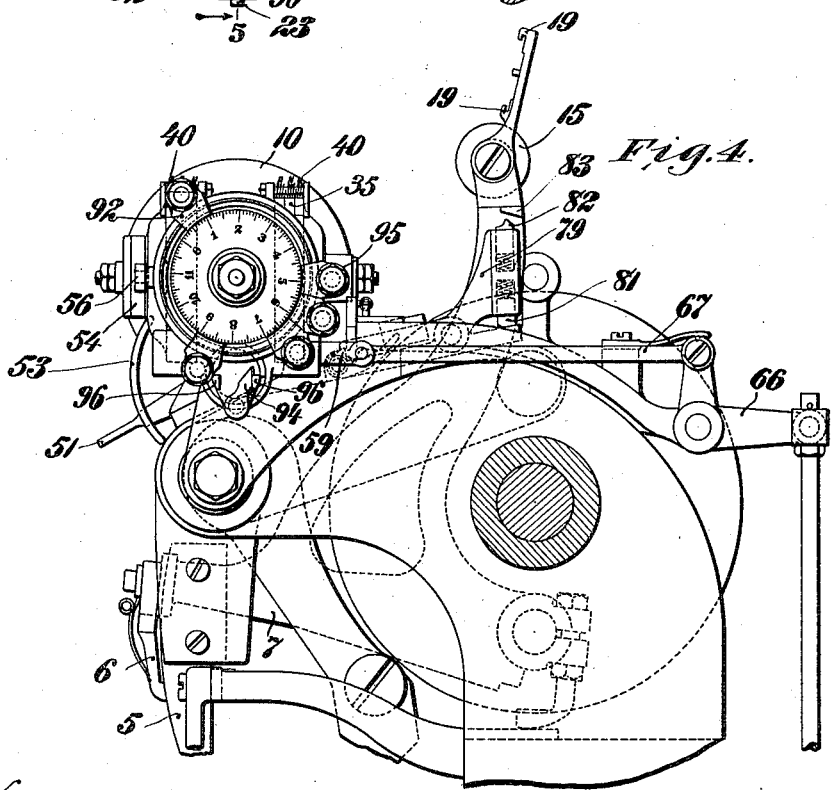

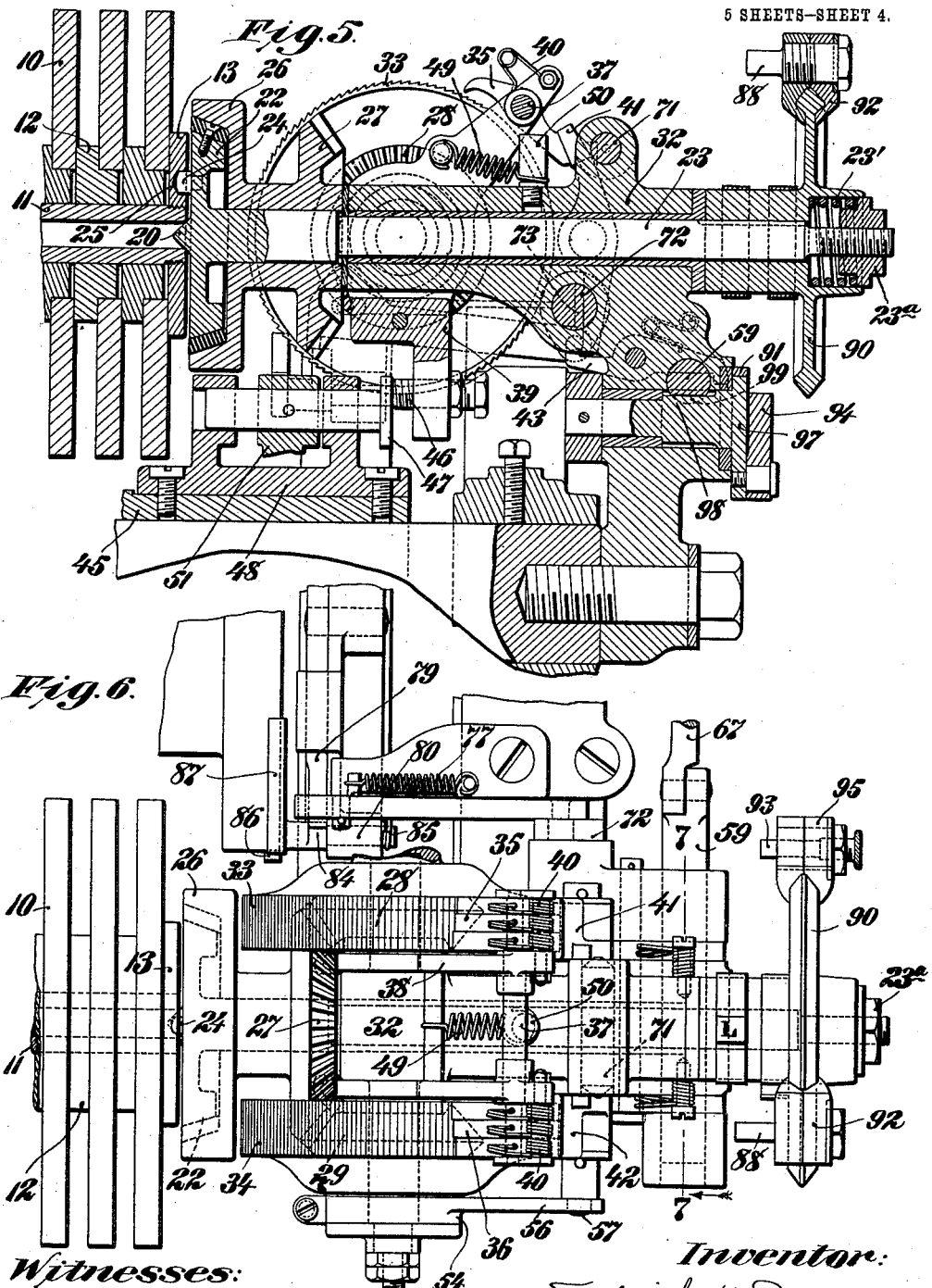

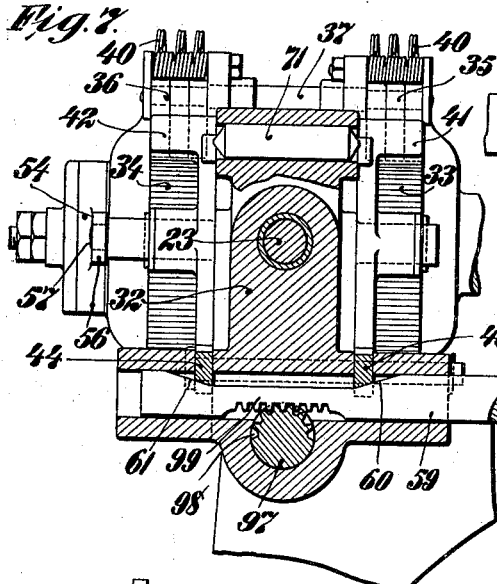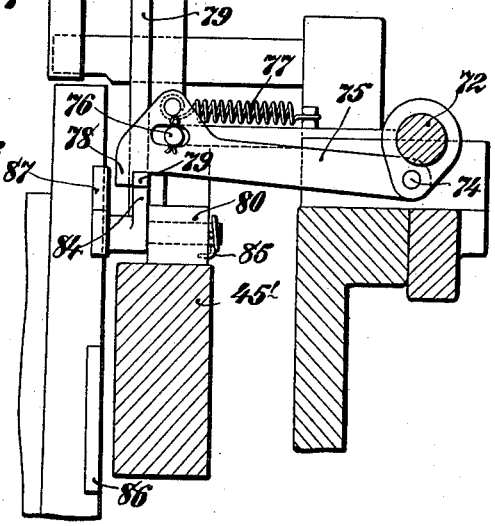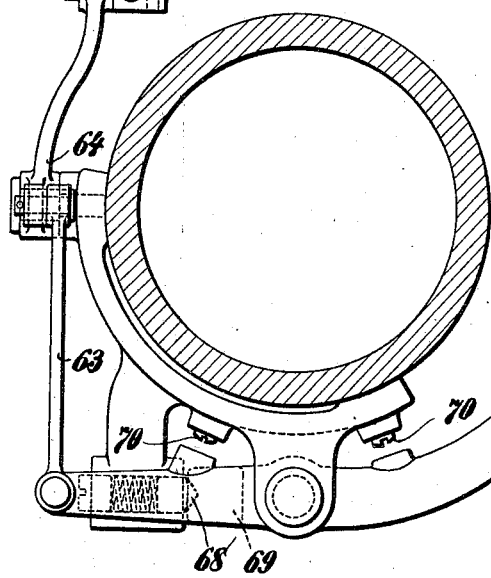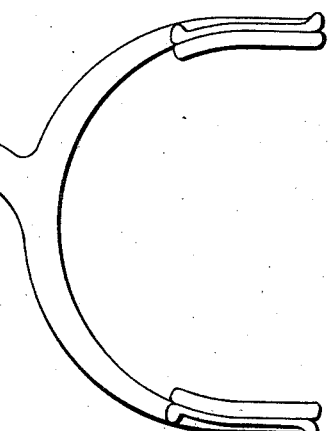

FREDERICK H. PERRY, OF BEVERLY, MASSACHUSETTS, ASSIGNOR TO UNITED SHOE MACHINERY COMPANY, OF PATERSON, NEW JERSEY, A CORPORATION OF NEW JERSEY.

MACHINE FOR OPERATING ON THE SOLES OF SHOES.

1,030,607. Specification of Letters Patent. Patented June 25, 1912.

Application filed December 11, 1908, Serial No. 466,930., Renewed February 24, 1912. Serial No. 679,765.

*To all whom it may concern:*

Be it known that I, FREDERICK H. PERRY, citizen of the United States, residing at Beverly, in the county of Essex and State of Massachusetts, have invented certain new and useful Improvements in Machines for Operating on the Soles of Shoes; and I do hereby declare the following to be a full, clear, and exact description of the invention, such as will enable others skilled in the art to which it appertains to make and use the same.

The invention relates to machines for operating upon the soles of shoes, and more particularly to that class of machines which are utilized for rounding or rounding and channeling the sole after the outer sole has been temporarily secured to the lasted shoe, and preparatory to permanently sewing or securing the outer sole to the shoe. Machines of this class as heretofore constructed have commonly been provided with mechanism for varying the relative position of the knife or knives and the gage which determines the position of the work to vary the projection of the sole at different parts of the shoe. In order that the sole may be trimmed comparatively close to the inseam through the shank of the shoe, it has been found desirable to guide the shoe during the operation of the trimming knife or the trimming and channeling knives upon the shank by a crease gage which engages and guides from the inseam. It has also been found desirable, in order that the contour of the sole about the forepart of the shoe may not be affected by variations and imperfections in the inseam, to employ a gage for guiding the shoe during the operation about the forepart, which engages and guides from the last close to the inseam or welt, and to provide means through which the operator may bring the forepart gage into operation when passing from the shank on to the forepart, and may throw it out of operation when passing from the forepart on to the shank.

It is one of the objects of the present invention to provide mechanism for varying the relative position of the forepart gage and knife or knives of such a machine which will enable the machine to operate upon various styles of shoe.

To this end one feature of the invention contemplates the provision in a machine provided with a gage which may be thrown into and out of operation, of a plurality of means for varying the relative position of the gage and tool or tools, constructed and arranged to impart different relative movements to the gage and tool for shoes of different styles, and means for rendering any one of said means operative. The specific construction and arrangement of the means for relatively actuating the knife and gage is not material to the invention in its broader aspects. It is preferred, however, to employ a series of cams for relatively actuating the gage and tool, and to provide means for rendering any one of said cams operative when the gage is moved into active position.

A further feature of the invention contemplates the provision in a machine provided with means for relatively actuating a tool and gage to determine the path of travel of the tool about the shoe, of a plurality of cams for relatively actuating the tool and gage which are mounted side by side upon a rotary carrier, and any one of which may be rendered operative by relative adjustment between the cams and the connections between the gage or tool. This feature of the invention is not confined in its application to constructions in which the gage is movable into and out of operation, but may be embodied in machines in which the guiding gage remains in operation during the entire operation upon the shoe.

In operating upon shoes in which the projection of the sole varies at different points about the shoe, the cam or other controlling device through which the relative position of the gage and tool is varied should be actuated during the operation upon those portions of the sole where the variation in the projection of the sole occurs, and the movements of the cam or other controlling device should be properly timed with relation to the travel of the tool about the shoe. Since the feed of the shoe is modified to a greater or less extent by the operator in manipulating the shoe, the cam or other controlling device is liable to get out of proper relation to the shoe as the cam is advanced during the travel of the tool about the shoe.

A further feature of the invention accordingly contemplates the provision in a machine in which the mechanism for relatively actuating the gage and tool is actuated in opposite directions in operating upon right or left shoes, of means under the control of the operator for correcting the relative positions of the shoe and the mechanism which determines the path along which the tool operates during the relative travel of the tool about the shoe. In accordance with this feature of the invention, any suitable form of mechanism may be employed which will enable the operator to bring the mechanism which relatively actuates the gage and tool into proper relation with the shoe during the relative travel of the tool about the shoe. In its preferred form the invention contemplates the employment of means for automatically interrupting the advance of the cam or other controlling mechanism in either direction, and means under the control of the operator for restarting said mechanism in either direction.

Further features of the invention contemplate the provision of improved means for supporting and actuating a series of cams for relatively actuating the tool and gage of a machine for operating upon the soles whereby the series of cams may be readily removed and introduced into the machine, and also the provision of improved means for correcting the position of the mechanism for varying the relative position of the tool and gage whereby the mechanism may be adjusted to vary the points in the relative travel of the tool about the shoe where the correction is effected.

The various features of the invention will be readily understood from an inspection of the accompanying drawings, in which—

Figure 1 is a front elevation of a rounding and channeling machine embodying the features of the invention in their preferred form; Fig. 2 is an elevation partly in section looking toward the right in Fig. 1; Fig. 3 is a partial plan view; Fig. 4 is a side elevation looking toward the left in Fig. 1; Fig. 5 is a vertical section on line 5—5, Fig. 3; Fig. 6 is a plan view of the parts shown in Fig. 5; Fig. 7 is a sectional detail on line 7—7, Fig. 6; Fig. 8 is a detail view showing certain parts to be hereinafter described; Fig. 9 is a detail showing the knee lever to be described; and Fig. 10 is a detail elevation of the parts shown in Fig. 8.

The machine shown in the drawings is provided with a trimming knife 1, a work support 2, which also acts as a crease guide for guiding the shoe during the operation of the trimming and channeling knives along the shank, a sole support in the form of a roll 3, a channel knife 4, a feed plate 5, which also acts as a cutting block, and a forepart guide 6 which is carried on the front end of a lever 7. These parts are constructed, arranged and operated in substantially the same manner as the corresponding parts shown and described in the patent to French and Meyer, No. 599,602, dated February 22, 1898, to which reference may be had for a full understanding of their construction and mode of operation.

The lever carrying the forepart guide is held normally in raised position by a spring 8, and is connected by a rod 9 with a treadle through which the operator may throw the guide into and out of operation at the proper time during the trimming and channeling of the sole of the shoe being operated upon. During the operation of the trimming and channeling knives upon the sole of the shoe, the shoe is guided by the crease guide 2 while operating upon the shank, and as the ball line is reached the operator depresses the treadle connected with the rod 9, thus bringing the forepart guide 6 down into position to engage the upper of the shoe. The forepart guide remains in operative position during the operation upon the forepart, and is thrown out of operation as the ball line on the opposite side of the shoe is reached, by releasing the treadle connected with the rod 9. When the forepart guide is thrown into operation, the relative position of the guide and trimming knife is controlled to give the desired outline to the sole by one of a series of cams 10, any one of which may be rendered operative at the will of the operator. The cams 10 are carried upon an arbor 11, and are secured in fixed relation upon the arbor by keys or other suitable connecting devices not shown. The cams may be conveniently formed of wood, and secured to metal hubs 12, the hubs being secured in fixed relation to each other and in fixed position upon the arbor. As shown, the cams are confined between a head or flange 13 formed on one end of the arbor, and a plate or nut 14 screwed on to the other end of the arbor. The upper end of the gage carrying lever 7 is provided with a roll 15 which is adjustably mounted upon a rod 16 so that it may be conveniently adjusted into position to engage any one of the series of cams 10 when the gage carrying lever is depressed to throw the forepart gage into operation. The roll is held in adjusted position upon the rod by means of a spring pressed pin 17 mounted in the roll and arranged to engage any one of a series of annular grooves 18 formed in the rod and corresponding to the series of cams 10. The upper end of the gage carrying lever 7 may also be provided with guides 19 for receiving a scale plate to indicate the different styles corresponding to the different cams. The arbor carrying the series of cams 10 is so mounted that it may be readily removed and replaced by an arbor carrying a different set of cams, so that any desired outline may be given to the sole by selecting the properly shaped cam. As shown, the arbor is supported between two centers 20 and 21, and the center 21 which supports the outer end of the arbor is so mounted that it may be readily withdrawn to enable the removal and insertion of the arbors. The cams are intermittently advanced during the operation of the machine, and each cam is shaped to so vary the position of the guide during the rounding operation as to give a predetermined contour to the forepart of a shoe sole. In order that the same cam may be used in operating upon both right and left shoes, and thus uniformity of shape be insured, the means for actuating the cams is so constructed that the movements of the cams may be reversed, the cams being driven in one direction when operating upon right shoes, and in the reverse direction when operating upon left shoes. In the construction shown the cams are driven through a friction clutch, one member 22 of which is formed on the end of the shaft 23, and is provided with a lug 24 arranged to engage a recess 25 formed in the head 13 of the cam carrying arbor, and thus couple the clutch member and arbor together. The other member 26 of the clutch is formed on the hub of a beveled gear 27 which is mounted on the shaft 23, and is engaged by two oppositely arranged beveled gears 28 and 29. The clutch members are forced together by a spring 23', the tension of which may be adjusted by the nut 23$^a$. The gears 28 and 29 are mounted to turn freely on studs 30 and 31, which project in diametrically opposite directions from the bearing 32 in which the shaft 23 is mounted. Motion is imparted to one or the other of the gears 28 and 29 to move the cams 10 in one direction or the other through ratchet wheels 33 and 34 formed on the hubs of the gears 28 and 29 respectively. A series of pawls 35 are arranged to engage and guide the ratchet wheel 33, and a similar series of pawls 36 are mounted to engage and drive the ratchet wheel 34. These pawls are mounted on the opposite ends of a stud 37 carried in the outer ends of the arms 38 of a yoke 39, the arms of the yoke being mounted to turn upon bearings formed at the inner ends of the hubs of the gears 28 and 29, as shown in Fig. 3. The pawls are forced in a direction to engage the ratchet wheels by springs 40, and are normally held out of engagement with the ratchet wheel against the tension of the springs by latching levers 41 and 42, the upper ends of which are arranged to engage the rear ends of the pawls, as indicated in Fig. 5. The latching levers are retained in position until released by the operator by latches 43 and 44 which engage the lower ends of the latching levers.

The pawl carrying yoke or arm 39 is reciprocated during the operation of the machine from the reciprocating slide sleeve 45 which carries the feed plate 5. As shown in Fig. 5, the lower end of the pawl carrying yoke 39 is provided with an adjustable screw 46 arranged to engage a pin 47 which is mounted in a bracket or plate 48 secured to the reciprocating sleeve 45. When the sleeve 45 moves toward the right in Fig. 5, the pin 47 engages the screw in the pawl carrying yoke and swings the yoke in a direction to advance the pawls. When the sleeve 45 moves toward the left, the pawl carrying yoke is swung in the opposite direction to retract the pawls by the action of a spring 49. The retracting movement of the pawl carrying yoke will continue until the stud 37 engages the upper end of a stop pin 50, when the pawl retracting movement of the yoke will be arrested. In order that the feed or advance of the cams 10 during the operation of the machine may be varied in accordance with the size of shoe being operated upon, means are provided for varying the movement imparted to the cams. For this purpose the pin 47 is adjustably mounted in the bracket 48, so that its position with relation to the screw 46 in the pawl carrying yoke may be varied. For convenience in adjusting the pin an arm 51 is secured to the pin and is extended through a slot 52 formed in a plate 53, which is secured in fixed position at the front of the machine. The slot is so shaped that a movement of the arm 51 longitudinally of the slot will give a longitudinal movement to the pin 47, the position of the pin depending upon the position which the arm 51 occupies in the slot 52. A scale may be provided at the side of the slot to indicate the proper adjustment of the arm 51 corresponding to different sizes of shoes. When the arm 51 is in the upper end of the slot, the pin 47 will be moved into such position that it will not engage and operate the pawl carrying yoke when the reciprocating sleeve 45 is moved to the right, and no movement will therefore be imparted to the pawl carrying yoke. When the lever 51 is in the lower end of the slot, the pin 47 will occupy its extreme right-hand position in the bracket 48, and will impart the maximum movement to the pawl carrying yoke. When the arm 51 is in an intermediate position, the pin 47 will engage the pawl carrying yoke after it has completed part of its stroke toward the right, and will operate the pawl carrying yoke during the completion of its stroke. On the return stroke of the pin 47, the lower end of the pawl carrying yoke will move toward the left with the pin until the stud 37 on the yoke engages the stop pin 50, when the retracting movement of the yoke will cease, and during the continued movement of the pin 47 toward the left it will move away from the lower end of the pawl carrying yoke. Thus by adjustment of the pin 47 the extent to which the cams 10 are moved during each reciprocation of the slide sleeve 45 in feeding the shoe may be varied in accordance with the size of shoe being operated upon. The ratchet wheel 34 is frictionally held in position during the retracting movement of the pawls by means of a brake sleeve 54 which surrounds a friction disk 55 secured to the hub of the gear 29. The brake sleeve is provided with an arm 56, the outer end of which engages a pin 57, and is also provided with an adjustable spring 58 (Fig. 1) through which the braking friction may be regulated. The ratchet wheel 33 is similarly held by a friction disk 33′ (Fig. 3). When the forepart gage is thrown into operation, and the roll on the gage carrying lever is brought into engagement with one of the pattern cams 10, both sets of pawls 35 and 36 are held out of engagement with the ratchet wheels by the latch levers 41 and 42. At this time one set of pawls should be thrown into operation so that the operative cam may be advanced during the rounding or rounding and channeling of the forepart to vary the relative position of the guide and knives to give the sole the contour corresponding to the contour of the operative cam. With the parts constructed and arranged as shown, the pawls 35 should be thrown into operation in case the cam is in the proper position for rounding a right shoe, and the pawls 36 should be thrown into operation in case the cam is in the proper position for operating upon a left shoe. In the machine shown, the throwing into operation of the proper pawls to drive the cam in one direction or the other is effected by the operator. The mechanism through which the operator controls the throwing in of the pawls comprises a slide bar 59 arranged below the outer ends of the latches 43 and 44 which hold the pawls out of operation (Figs. 5 and 7). The bar 59 is provided with oppositely arranged inclined cam surfaces 60 and 61 arranged to engage the latches 43 and 44 respectively. The bar is normally in the position indicated in Fig. 7. If the bar is moved toward the right from this position, the cam 61 will operate the latch 44 and disengage its inner end from the lower end of the latch lever 42, so that the pawls 36 will be released and will engage the ratchet wheel 34. If the bar 59 is moved in the opposite direction, the cam 60 will operate the latch 43 to release the pawls 35 so that they will engage the ratchet wheel 33. The cam slide 59 may be moved in one direction or the other to throw in either the pawls 35 or the pawls 36, by means of a knee lever 62, the rear end of which is connected by a link 63 with one arm of a bell crank lever 64, the other arm of which is connected by a vertical rod 65 with one arm of a second bell crank lever 66, the other arm of which is connected by a link 67 with the slide 59. The knee lever is normally held in mid-position by a spring pressed pin 68 provided with a V-shaped end arranged to engage a V-shaped recess in a lug 69 on the lever. Stops 70 are provided for limiting the movement of the lever in either direction. The connections between the knee lever and the bar 59 should be so adjusted that the bar 59 is in its mid-position shown in Fig. 7 when the knee lever is in its mid-position as shown in Fig. 9. The connections between the knee lever and bar are such that a movement of the lever toward the right will move the bar 59 toward the left in Fig. 7, thus throwing the pawls 35 into operation, and a movement of the knee lever toward the left will shift the bar 59 in the opposite direction, thus throwing the pawls 36 into operation. The operator therefore moves the knee lever toward the right in starting the pattern driving mechanism when operating upon a right shoe, and moves the lever toward the left in starting a pattern mechanism when operating upon a left shoe. When the pressure upon the knee lever is relieved, the lever will be immediately returned to mid-position by the spring pressed pin 68.

In order to prevent accidental engagement of both sets of pawls with their respective ratchet wheels, a device is provided which prevents the engagement of either set of pawls with its ratchet wheel when the other set of pawls is in engagement with its ratchet wheel. In the construction shown, this device consists of a pin 71 having its opposite ends arranged directly back of the upper ends of the latch levers 41 and 42. The ends of the pins are conical and the pin is slightly longer than the distance between the latch levers 41 and 42. When the upper end of the latch lever 41, for instance, swings back as the pawls 35 engage the ratchet wheel 33, the latch lever engages the end of the pin 71 and forces it toward the left in Fig. 7, the latch lever passing across the end of the pin so that it is locked against movement toward the right by the latch lever. The left-hand end of the pin 71 now projects back of the latch lever 42, so that this lever is locked in position and cannot move to allow the pawl 36 to engage the ratchet wheel 34. In a similar manner the latch lever 41 is locked against movement when the latch lever 42 is swung back by the movement of the pawls 36 into engagement with the ratchet wheel 34. When either set of pawls is released so that it will engage the corresponding ratchet wheel, the pawls remain in action until the forepart gage is thrown out of operation, when the active pawls are returned to normal or inactive position. The mechanism for thus returning the active pawls to inactive position comprises a rock shaft 72 provided with flattened portions 73 arranged to engage the lower ends of the latch levers 41 and 42 when the shaft is rocked, and swing these levers into position to retain the pawls 35 and 36 out of engagement with the corresponding ratchet wheels, and to bring the lower ends of the levers into position to be engaged by the latches 43 and 44. The rock shaft is provided at one end with a crank pin 74 to which the rear end of the link 75 is pivoted (Fig. 8). The front end of the link 75 is supported upon a pin 76 which engages a slot in the link, and the link and rock shaft 72 are held in normal position by means of a spring 77. The front end of the link 75 is provided with a shoulder or hook 78 arranged to be engaged by the front end of a lever 79 mounted upon the arm 45′ which extends from the feed slide 45. The lever 79 is pivoted in a plate 80 secured upon the upper side of the arm 45′, and is held in position with its front end resting upon the arm 45′ by a spring pressed pin 81, mounted in the rear end of the lever, and bearing upon the top of the plate 80 (Fig. 2). The rear end of the lever 79 also carries a spring pressed latch pin 82, the upper end of which is arranged to be engaged by a finger 83 projecting from the gage carrying lever 7. The upper end of the latch pin is so shaped that the finger 83 as the lever 7 swings back will engage the pin and swing the lever 79 about its pivot, thus bringing the front end of the lever up into position to engage the hook 78 on the link 75. When the lever 79 is swung into this position, it is retained in position by a latch lever 84 pivoted in the plate 80 and forced in a direction to carry it under the front end of the lever 79 by a spring 85. If the lever 79 is not in such position that its front end will pass up back of the hook 78 when the gage 7 is swung back, then the lever 79 will ride along the lower end of the hook 78 until the end of the lever passes behind the hook, when the lever will swing into position to bring the front end of the lever up back of the hook 78. As soon as the lever swings into this position, the latch 84 will swing under the front end of the lever and retain it in position. Now when the feed sleeve and arm 45′ move toward the left in Fig. 8, the link 75 will be operated to rock the shaft 72, and thus operate the latch lever 41 or 42, corresponding to the active pawls, to disengage the pawls and latch them out of action. After the rock shaft 72 has been thus operated, a cam 86 rides against the end of a lever 87 which is secured to the latch lever 84, rocking the latch lever out from under the front end of the lever 79, so that the front end of the lever swings down into normal position. This disengages the front end of the lever 79 from the hook 78 on the link 75 so that the link and rock shaft 72 are returned to normal position by the spring 77. When the gage carrying lever 7 is swung forward, the finger 83 rides over the spring latch pin 82 and does not operate the lever 79.

The travel or advance of the cams 10 in either direction is determined by devices which arrest the movement of the cams after they have made a partial revolution in either direction. In the form shown these devices comprise two stop pins 88 and 89 which are carried upon a disk 90 keyed upon the outer end of the shaft 23 so that it will revolve with the cams. The stop pins 88 and 89 are arranged to coöperate with a fixed stop in the form of a lug or sleeve 91 which projects from the bracket in which the bearing 32 for the shaft 23 is formed. The stop pins 88 and 89 are preferably secured to the disk 90 so that they may be adjusted to render more or less of the periphery of the cam operative, or to vary the operative part of the cam so that the same cam may be utilized for different styles. This adjustment is provided for in the construction shown by mounting the stop pins in clamping jaws 92 which embrace the rim of the disk 90, and may be clamped in any desired position about the periphery of the disk.

In operating upon shoes in which the projection of the sole varies at different parts throughout the forepart of the shoe, the advance of the cam should continue substantially throughout the rounding of the forepart, and the operative periphery of the cam should be of sufficient extent to control the relative position of the gage and knife while operating upon the forepart of the shoe. When the operative periphery of the cam is of such extent, and the advancing movement of the cam continues during the operation upon the forepart, the cam is liable to get out of time—that is, out of proper relation to the shoe, owing to the fact that while the advance or feed of the cam is uniform, the advance or feed of the shoe which is dependent more or less upon the manner in which the shoe is manipulated by the operator necessarily varies. In order that the operative cam and the shoe being operated upon may be maintained in proper relation throughout the relative travel of the tool about the shoe, means are provided whereby the position of the cam with relation to the shoe may be corrected at intervals during the relative travel of the tool about the shoe in either direction. In the form shown, this means comprises a series of timing stop pins 93 for interrupting the movement of the operative cam carried by the disk 90 and arranged to coöperate with a fixed stop 94 in interrupting the advance of the cams 10. The timing stops are adjustably secured upon the disk 90 so that they may be set to vary the points at which the correction of the relative position of the operative cam and shoe is effected, in accordance with the style of shoe being operated upon, and in accordance with the cam which is operative. The timing stop pins are mounted in clamps 95 which embrace the rim of the disk 90 and may be secured in any desired position about the periphery of the disk. The pins are also mounted in the clamps so that they may be withdrawn and rendered inactive if desired. In order that the timing pins and fixed stop may operate to arrest the movement of the cam at the same point when moving in either direction, the stop 94 is in the form of a pivoted finger mounted between two lugs 96 which are formed on the end of a rock shaft 97 (Figs. 4 and 5). When the timing stops are traveling toward the left in Fig. 4, the stop finger 94 will be swung against the left-hand lug 96 when engaged by the pins, so that the center of the pin will be stopped midway between the lugs 96. When the stops are traveling toward the right in Fig. 4 the stop finger 94 will be swung against the right-hand lug 96 when engaged by the pins, so that the pin is stopped with its center substantially midway between the lugs. In order that the operator may re-start the advance movement of the cam, in case it has been arrested by a timing stop, when the point on the shoe corresponding to the adjustment of the timing stop is reached, means are provided under the control of the operator for moving the fixed stop out of the path of the stop pins 93. For this purpose the fixed stop is mounted on the rock shaft 97, and the rock shaft is provided with a gear segment 98 engaged by a rack 99 formed on the under side of the bar 59 which is connected with the knee lever 62. By means of these connections the operator may swing the stop 94 out of the path of the timing pins 93 by moving the knee lever toward the right or toward the left as the case may be. In operating upon right shoes the stop 94 will be moved against the left-hand lug 96 when it is engaged by the timing pins, and it may be swung out of the path of the timing pins by moving the knee lever toward the right. In operating upon left shoes, the fixed stop 94 will be against the right lug 96 when it coöperates with the pins 93 in stopping the advance of the cams, and it may be moved out of the path of the timing pins by the movement of the knee lever toward the left.

The fixed stop under the control of the operator, and the timing stop pins moving with the cam which controls the relative movement of the gage and tool, constitutes one form of means under the control of the operator for correcting the position of the pattern mechanism with relation to the sole during the relative travel of the tool about the shoe. The operator, for instance, may render three timing stops operative, and may set the stops to correspond to the points on the operative cam which should be engaged by the gage carrying lever when the cap line of the shoe is reached at one side of the toe, when the point of the toe is reached, and when the cap line on the other side of the toe is reached. With the timing stop pins thus adjusted, the advance movement of the cam will be arrested in case the point on the cam corresponding to the cap line is reached before the operating knives reach this point on the sole of the shoe. When the shoe has been trimmed to the cap line, the operator will shift the knee lever, thus withdrawing the fixed stop from the path of the timing stop pin, so that the advance movement of the cam will continue if the cam has been stopped, or will not be interrupted in case the cam has been advanced in proper time with the advance of the shoe. The cam and shoe will therefore be brought into proper relation or time when the cap line is reached. In the same way the cam and shoe will be brought into proper relation or time at the point of the toe and at the cap line on the opposite side of the shoe. The number of timing stop pins may be varied by withdrawing any of the pins so that it will not engage the fixed stop 94, and the points at which the relative position of the operative cam and shoe is corrected may be varied as desired by adjusting the timing stop pins about the periphery of the disk 90.

While the invention is particularly applicable to sole rounding and channeling machines, and has been illustrated and described as applied to such machines, it is to be understood that various features of the invention are also applicable to other machines for operating upon the soles of shoes in which it is desirable to provide means for relatively actuating the gage and tool in accordance with the various styles and sizes of shoes to be operated upon.

Having set forth the nature and object of the invention, and specifically described a machine in which the various features of the invention may be embodied, what I claim is:—

1. A machine for operating on the soles of shoes, having, in combination, a tool, a gage, means for throwing the gage into action during the relative travel of the tool about the shoe, a plurality of means for relatively actuating the tool and gage, constructed and arranged to impart different relative movements to the gage and tool for shoes of different styles, and means for rendering any one of said means operative, substantially as described.

2. A machine for operating on the soles of shoes, having, in combination, a tool, a gage, means for throwing the gage into action during the relative travel of the tool about the shoe, means for relatively actuating the gage and tool comprising a plurality of cams and intermediate connections, constructed and arranged to impart different relative movements to the gage and tool for shoes of different styles, and means for rendering any one of said cams operative, substantially as described.

3. A sole rounding or channeling machine, having, in combination, a knife, a gage, means for throwing the gage into action during the relative travel of the knife about the shoe, a plurality of means for relatively actuating the tool and gage constructed and arranged to impart different relative movements to the gage and knife for shoes of different styles, and means for rendering any one of said means operative, substantially as described.

4. A sole rounding or channeling machine, having, in combination, a knife, a gage, means for throwing the gage into action during the relative travel of the knife about the shoe, means for relatively actuating the gage and knife comprising a plurality of cams and intermediate connections constructed and arranged to impart different relative movements to the gage and knife for shoes of different styles, and means for rendering any one of said cams operative, substantially as described.

5. A machine for operating on the soles of shoes, having, in combination, a tool, a gage, means for relatively actuating the tool and gage comprising a plurality of cams and intermediate connections constructed and arranged to impart different relative movements to the gage and knife for shoes of different styles, a rotary carrier on which the cams are arranged in series side by side, mechanism for rotating the carrier during the relative travel of the tool about the shoe, and means for bringing any one of the cams into operative engagement with said connections, substantially as described.

6. A machine for operating on the soles of shoes, having, in combination, a tool, a gage, means under the control of the operator for throwing the gage into action during the relative travel of the tool about the shoe, means for relatively actuating the tool and gage comprising a plurality of cams and intermediate connections, means for actuating said cams in either direction during the relative travel of the tool about the shoe, and means for rendering any one of said cams operative, substantially as described.

7. A sole rounding or channeling machine, having, in combination, a tool, a gage, means for relatively actuating the tool and gage comprising a plurality of cams arranged in series side by side, means for actuating said cams in either direction during the relative travel of the tool about the shoe, and means for relatively adjusting the cams and connections to bring any one of the cams into operative engagement with the connections, substantially as described.

8. A sole rounding or channeling machine, having, in combination, a knife, a gage, means for relatively actuating the knife and gage comprising a series of cams arranged side by side, actuating mechanism therefor and means for supporting the series of cams having provision for the removal and replacing thereof without disturbing the actuating mechanism, substantially as described.

9. A sole rounding or channeling machine, having, in combination, a knife, a gage, means for relatively actuating the knife and gage comprising a series of cams, a cam carrier on which the cams are mounted side by side, centers between which the carrier is removably supported and actuating mechanism for the cams, substantially as described.

10. A machine for operating on the soles of shoes, having, in combination, a tool, pattern mechanism for determining the path along which the tool operates, means for actuating the pattern mechanism in either direction, and means under the control of the operator for correcting the position of the pattern mechanism with relation to the shoe during the relative travel of the tool about the shoe, substantially as described.

11. A sole rounding or channeling machine, having, in combination, a knife, a gage, mechanism for varying the relative position of the gage and knife during the relative travel of the knife about the shoe, means for actuating said mechanism in either direction and means under the control of the operator for correcting the position of said mechanism with relation to the shoe during the relative travel of the knife about the shoe, substantially as described.

12. A machine for operating on the soles of shoes, having, in combination, a tool, pattern mechanism to determine the path along which the tool operates, means for actuating the pattern mechanism in either direction, means for automatically interrupting the advance of the pattern mechanism, and manually restarting it during its movement in either direction, substantially as described.

13. A machine for operating on the soles of shoes, having, in combination, a tool, a gage, a cam for varying the relative position of the tool and gage during the travel of the tool about the shoe, mechanism under starting control of the operator for actuating the cam in either direction, means for determining the movement of the cam in either direction, and timing devices for arresting the movement of the cam during its travel in either direction, substantially as described.

14. A machine for operating on the soles of shoes, having, in combination, a tool, a gage, a cam for varying the relative position of the tool and gage during the travel of the tool about the shoe, mechanism under starting control of the operator for actuating the cam in either direction, and adjustable stops for interrupting the movement of the cam during its travel in either direction, substantially as described.

15. A machine for operating on the soles of shoes, having, in combination, a tool, a gage, mechanism for varying the relative position of the tool and gage during the relative travel of the tool about the shoe, means for actuating said mechanism in either direction including two pawls, means under the control of the operator for throwing either pawl into action and mechanism acting to automatically throw the pawl out of action, substantially as described.

16. A machine for operating on the soles of shoes, having, in combination, a tool, a gage, mechanism for varying the relative position of the tool and gage during the relative travel of the tool about the shoe, a series of stops moving with said mechanism, a coöperating stop and manually controlled means for operating the latter stop, substantially as described.

17. A machine for operating on the soles of shoes, having, in combination, a tool, a gage, a cam for varying the relative position of the tool and gage during the relative travel of the tool about the shoe, a series of stops connected to move with the cam, a coöperating fixed stop, and means for manually moving the fixed stop out of active position, substantially as described.

18. A sole rounding or channeling machine, having, in combination, a knife, a gage, means for moving the gage into and out of operative position, a series of reversible cams for varying the relative positions of the knife and gage, during the relative travel of the knife about the shoe, and means for rendering any one of said cams operative, substantially as described.

19. A sole rounding or channeling machine, having, in combination, a knife, a gage, a series of cams arranged side by side, means for moving the gage into and out of operative position and operatively connecting it with and disconnecting it from any one of said cams, and means for actuating said cams in either direction during the relative travel of the knife about the shoe, substantially as described.

20. A sole rounding or channeling machine, having, in combination, a knife, a gage, a series of cams, means for operatively connecting the gage and one of the cams and moving the gage into operative position, and mechanism for actuating the cams in one direction for operating on right shoes and in the opposite direction for operating on left shoes, substantially as described.

21. A sole rounding or channeling machine, having, in combination, a knife, a gage, a cam, means for operatively connecting the gage with the cam and moving the gage into operative position, mechanism under starting control of the operator to actuate the cam in either direction and means for interrupting the advance of the cam before it completes its movement in either direction, substantially as described.

22. A machine for operating on the soles of shoes, having, in combination, a tool, a plurality of means for relatively moving the shoe and tool to vary the distance of the point of operation from the inseam, constructed and arranged to impart different relative movements to the shoe and tool for shoes of different styles, means for rendering any one of said plurality of means operative, and actuating mechanism for said plurality of means adjustable for different sizes of shoes, substantially as described.

23. A machine for operating on the soles of shoes, having, in combination, a tool, means for relatively moving the shoe and tool to vary the distance of the point of operation from the inseam comprising a series of cams and connections constructed and arranged to impart different relative movements to the shoe and tool for shoes of different styles, means for rendering any one of said cams operative, and actuating mechanism for the cams adjustable for different sizes of shoes, substantially as described.

24. A machine for operating on the soles of shoes, having, in combination, a tool, means for relatively moving the shoe and tool to vary the distance of the point of operation from the inseam comprising a plurality of cams and connections constructed and arranged to impart different relative movements to the shoe and tool for shoes of different styles, means for actuating said cams in either direction adjustable for different sizes of shoes, and means for rendering any one of said cams operative, substantially as described.

25. A machine for operating on the soles of shoes, having, in combination, a tool, a shank gage, a forepart gage, means for throwing the forepart gage into or out of action when the juncture between the forepart and shank is reached, a plurality of means for relatively actuating the tool and forepart gage constructed and arranged to impart different relative movements to the gage and tool for shoes of different styles, and means for rendering any one of said plurality of means operative, substantially as described.

26. A machine for operating on the soles of shoes, having, in combination, a tool, a shank gage, a forepart gage, means for throwing the forepart gage into or out of action at the juncture of the forepart and shank, a plurality of cams for relatively moving the forepart gage and tool to vary the distance of the point of operation from the inseam shaped to impart different relative movements to the gage and tool for shoes of different styles, and means for rendering any one of said cams operative, substantially as described.

27. A machine for operating on the soles of shoes, having, in combination, a tool, a shank gage, a forepart gage, means for throwing the forepart gage into and out of action during the relative travel of the tool about the shoe, means for moving the forepart gage to vary the distance of the point of operation from the inseam comprising a series of cams and connections constructed and arranged to impart different movements to the forepart gage for shoes of different styles, means for rendering any one of said cams operative, and means for actuating said cams in either direction during the relative travel of the tool about the shoe, substantially as described.

28. A machine for operating on the soles of shoes, having, in combination, a tool, a forepart gage, means for throwing the gage into and out of action during the relative travel of the tool about the shoe, mechanism for varying the relative position of the tool and gage, means for actuating said mechanism in either direction including two pawls, means under the control of the operator for throwing the pawls alternately into action, and mechanism acting upon the movement of the gage out of action for rendering both pawls inactive, substantially as described.

29. A machine for operating on the soles of shoes, having, in combination, a tool, a pattern mechanism for determining the path along which the tool operates, means for feeding the pattern mechanism in opposite directions for right and left shoes, and adjustable stops connected to move with the pattern mechanism for determining its movement in either direction, substantially as described.

30. A machine for operating on the soles of shoes, having, in combination, a tool, a pattern mechanism for determining the path along which the tool operates, a disk connected to move with the pattern mechanism, stops adjustably secured on the disk, and means for feeding the pattern mechanism in opposite directions, substantially as described.

31. A machine for operating on the soles of shoes, having, in combination, a tool, a gage, a pattern cam for relatively actuating the tool and gage to determine the path along which the tool operates, a disk connected to move with the cam, means for feeding the cam in opposite directions for right and left shoes, and stops adjustably secured to the disk to determine the operative part of the cam and its movement in either direction, substantially as described.

In testimony whereof I affix my signature, in presence of two witnesses.

FREDERICK H. PERRY.

Witnesses:
　IRA L. FISH,
　ANNIE C. RICHARDSON.